United States Patent [19]

Kamm et al.

[11] 3,986,612

[45] Oct. 19, 1976

[54] RANDOM ACCESS CARD STORAGE AND RETRIEVAL SYSTEM

[75] Inventors: Lawrence J. Kamm, San Diego; Minard A. Leavitt, Manhattan Beach, both of Calif.

[73] Assignee: Cutler-Hammer, Inc., Milwaukee, Wis.

[22] Filed: Nov. 7, 1974

[21] Appl. No.: 521,635

[52] U.S. Cl. .......................... 209/111.7 R; 250/569
[51] Int. Cl.² ........................................ B07C 5/344
[58] Field of Search ............... 209/73, 74 R, 110.5, 209/80.5, 111.7, 111.6, 111.8; 250/555, 556, 557, 566–569

[56] References Cited
UNITED STATES PATENTS

| | | | |
|---|---|---|---|
| 2,644,458 | 7/1953 | Meagher | 209/110.5 |
| 3,532,859 | 10/1970 | Laplume | 250/555 |
| 3,580,391 | 5/1971 | Littlefield | 209/111.7 |
| 3,595,388 | 7/1971 | Castaldi | 209/80.5 |
| 3,721,343 | 3/1973 | Mustain | 209/110.5 |
| 3,731,060 | 5/1973 | Weinstein | 209/80.5 |
| 3,738,487 | 6/1973 | Way | 209/80.5 |
| 3,757,944 | 9/1973 | Goodman | 209/111.7 |
| 3,792,268 | 2/1974 | Bjerke et al. | 250/555 |

*Primary Examiner*—Allen N. Knowles
*Attorney, Agent, or Firm*—Kevin Redmond

[57] ABSTRACT

Apparatus for transferring a designated card or card-like article such as a microfiche into or out of a stack of similar cards by producing a separation in the stack at a selected location with a stream of air and moving the designated card into or out of the separation with a vacuum pickup arm. The selected stack location is verified by reading means located outside of the stack and directed at retroreflective marks on the card exposed by the separation.

8 Claims, 7 Drawing Figures

RANDOM ACCESS CARD STORAGE AND RETRIEVAL SYSTEM

BACKGROUND

1. Field

This invention relates to improvements in the storage and retrieval of cards and microfiche.

2. Prior Art

Prior art systems for storage and retrieval of fiche require that the fiche be placed in holders, which are usually individual frames, to prevent scratching, abrasion and other damage to the fiche that would otherwise result from rubbing and excessive localized pressures in normal operation. The holders significantly increase the cost and volume necessary to store the fiche, especially in large systems where the number of fiche may exceed one million.

SUMMARY

In accordance with the present invention, direct pneumatic manipulation of the cards eliminates the need for holders and thereby provides appreciable savings in storage cost and volume over prior art systems.

A typical embodiment of this invention includes a card storage assembly, a transfer module, a control unit, and an input station. The module includes a nozzle, a reading unit designed to illuminate and detect retroreflective identification marks, and a vacuum pickup arm adapted to pick up, hold and release a card.

In the operation of this system, a request for the transfer of a designated card entered at the input station is transmitted to the control unit where control signals are generated to direct the transfer module to travel to a particular bin in the card storage assembly. A stream of air from the nozzle opens a separation in a stack of cards in the bin. The reading unit then detects retroreflective identification marks on a card exposed by the separation. The output of the reading unit is transmitted to the control unit where control signals are generated to adjust the position of the stream of air, and thus the location of the separation, until a selected location is found. The vacuum pickup arm then moves into and out of the separation to transfer the designated card.

DESCRIPTION OF THE PREFERRED EMBODIMENT

Figure 1:
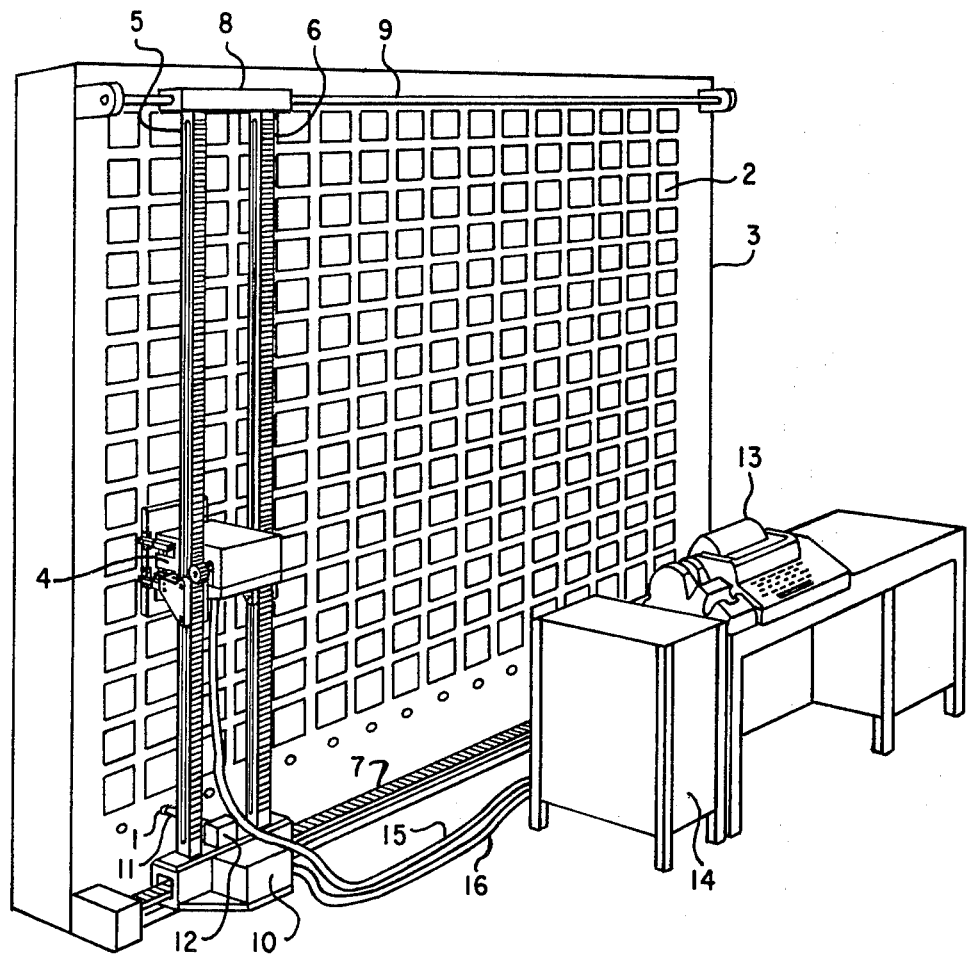
FIG. 1 is a perspective drawing of a card storage and retrieval system embodying the present invention.

Referring to FIG. 1, card storage assembly 3 consists of a plurality of bins, identical to bin 2, for the storage of stacks of cards. Horizontal guide rails 7 and 9, mounted in front of the card storage assembly, are the main support members for vertical guide rails 5 and 6. The vertical guide rails are connected at the top to a bearing 8, which is slideably mounted on guide rail 9, and at the bottom to a horizontal drive assembly 10 which contains a horizontal drive motor and a pinion gear drive assembly designed to engage a rack on guide rail 7. A transfer module 4 is slideably mounted on vertical guide rails 5 and 6 and is driven in the vertical direction by a vertical drive motor and pinion drive assembly contained within the module, which engages racks on vertical rails 5 and 6. A solenoid drive unit 12, mounted on the horizontal drive assembly, is used to drive a locating pin 11 into a locating hole, such as hole 1, at the base of a column of bins to accurately align the module with any bin in the column.

A control unit 14 generates control signals which are transmitted to the transfer module and the horizontal drive assembly via cables 15 and 16 respectively. The control unit is typically an electronic computer which includes a memory and a processing section. As each card is placed in storage, a representation of its location is entered in the memory section.

An input station 13, which includes a teletypewriter or other suitable input device, receives information used to direct the operation of the system. The entry information is typed on the teletypewriter where it is converted to electrical signals for transmission to the control unit 14. The information entered at the input station 13 usually includes a transfer request, indicating whether insertion or retrieval is desired, and an identification of a card in storage at the location selected for transfer. The card identification information is supplied to the memory section of the control unit, while the transfer request is supplied as one input to the processing section. The memory section responds to the card identification information by generating a signal representing the desired transfer location. The transfer location signal is supplied as a second input to the processing section. The processing section, which has been programmed with a subroutine to respond to these two inputs, generates control signals which direct the module 4 to travel to the selected location and effect the requested transfer.

Cards may be inserted at locations which are randomly selected, eliminating the need to supply a particular location with the input information. In this mode of operation, the identification marks on a card adjacent to the inserted card are detected and a representation of these marks is placed in the memory to identify the storage location for retrieval purposes.

Figure 2:
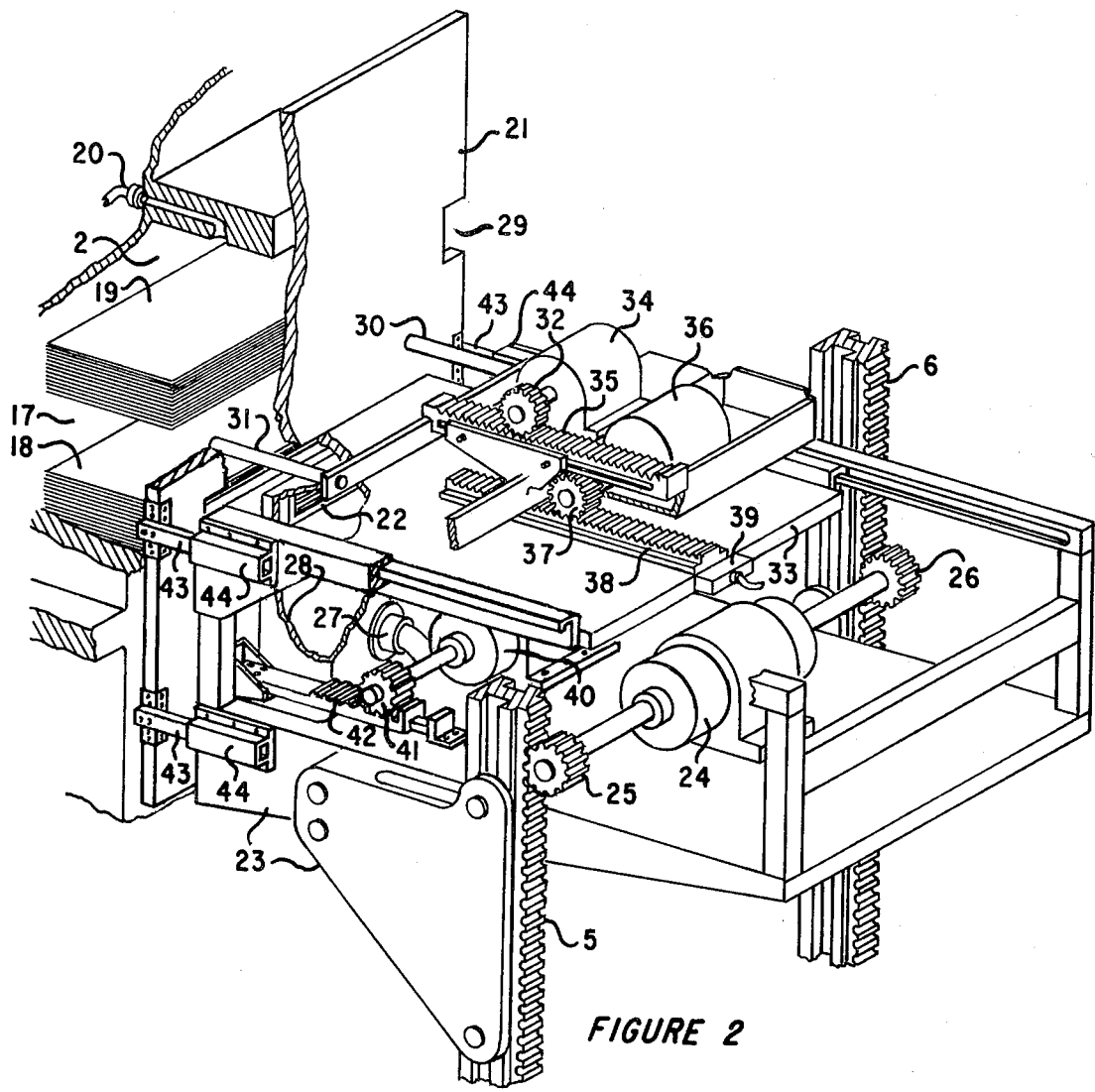
FIG. 2 is a perspective drawing of a transfer module used in the system shown in FIG. 1 with the cover removed to show the internal components of the module.

Referring to FIG. 2, frame 23, which is the main support member of the module, is slideably mounted on vertical rails 5 and 6. A cover plate 21, which is designed to cover the face of a bin to which the module has been driven, is slideably mounted on frame 23 by means of channel brackets 44 and rectangular slide rods 43. The plate is backed off from the face of the bin, facilitating transporting the module from one bin location to another, by means of a drive motor 40 mounted on the frame 23, a pinion 41 mounted on the shaft of the drive motor 40 and a rack 42 connected to the plate 21. The drive mechanism used to propel the module in the vertical direction comprises a vertical drive motor 24, which is mounted on frame 23, and pinion gears 25 and 26 which engage racks on rails 5 and 6. The vertical drive mechanism may include additional fine positioning means, not shown and not a part of this invention, in addition to the rack and pinion drive shown in FIG. 2.

A nozzle 22 is mounted on and extends through the cover plate 21. A chamber 28, enclosing the rear of the nozzle, contains an input port 27 through which the nozzle is supplied with compressed air. The compressed air and a vacuum, which is also required, are supplied by external sources not shown.

Figure 4:
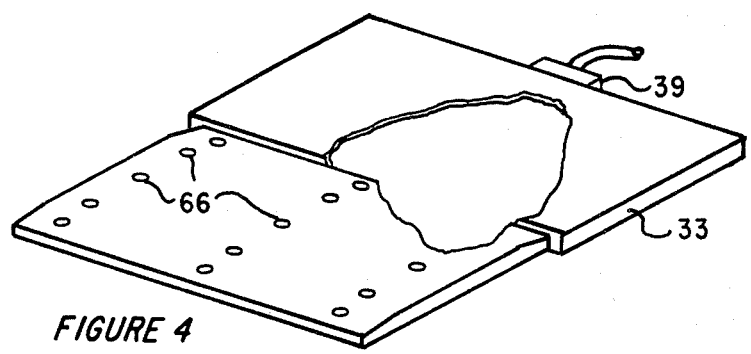
FIG. 4 is a drawing of a vacuum pickup arm showing a number of suction ports located on its lower face.

A vacuum pickup arm 33, located above the main nozzle 22, is driven into and out of the bin 2 through an opening in the cover plate by drive motor 36 and pinion gear 37 which engages rack 38 on top of the pickup arm 33. The arm is hollow, providing an air passage from vacuum application port 39 to suction ports 66 on the lower face of the arm as shown in FIG. 4.

Returning to FIG. 2, support rods 30 and 31 are slideably mounted through two holes in the cover plate. The rods are designed to be driven into and out of the bin by a drive motor 34 and a pinion gear 32 which engages a rack 35. Above the support rods 30, 31 on the cover plate 21 are two symmetrically located discharge ports 29, one of which can be seen on the right-hand portion of the cover plate 21.

A stack compression input port 20 at the top of bin 2 is used to admit air under pressure to the bin to compress the stack to close up random spaces between the cards prior to a card search. This operation ensures that each card is placed a known distance from the bottom of the bin, facilitating the search for a card at a selected location.

An air stream projected from the nozzle divides a stack of cards, as shown in bin 2, into a lower stack 18 and an upper stack 19, spaced apart by a stack separation 17. The compressed air that enters the separation from the nozzle escapes through discharge ports 29. The upward sweep of the air through the stack separation 17 and about the upper stack 19 helps to lift the upper stack 19 and maintain it in position.

The cover plate 21 prevents cards agitated by the air stream from being blown from the bin. The plate also controls the flow of air within the bin by impeding outward flow except at the discharge ports.

Figure 3:
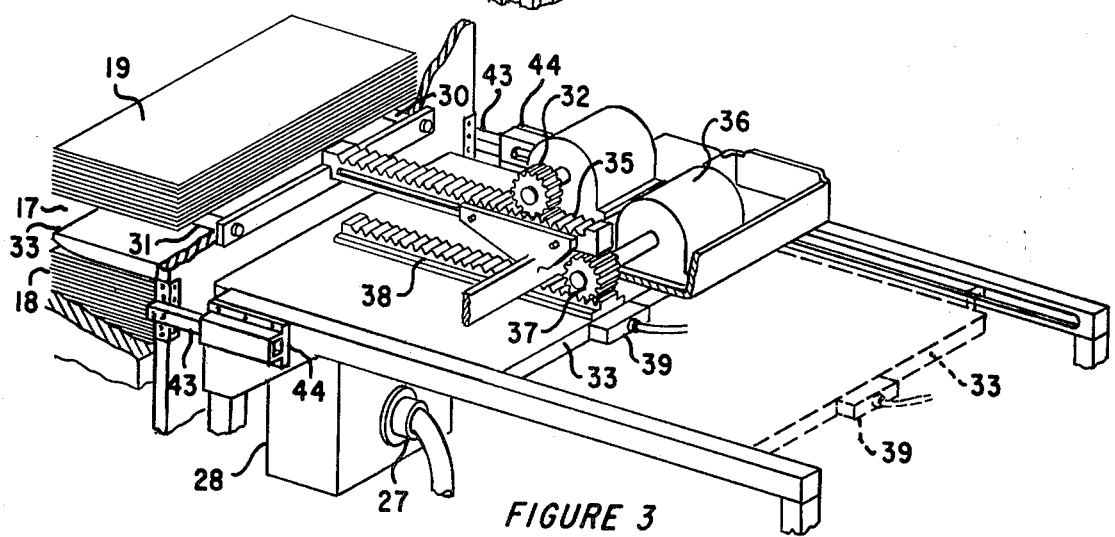
FIG. 3 is a perspective view of the transfer module showing a vacuum pickup arm extending into a separation in a card stack.

To retrieve a designated card from storage, support rods 30 and 31 are driven into the separation at the selected location and the air supplied to the nozzle 22 is shut off, allowing the upper stack to drop to and rest on the support rods. The pickup arm 33 is inserted and the module is driven downward until the bottom face of the arm is adjacent the designated card located on top of the lower stack 18. The positions of the support rods 30, 31 and the pickup arm 33 after insertion are shown in FIG. 3. Vacuum is applied through port 39 and the hollow pickup arm to the section ports 63. The designated card is drawn by the vacuum to the arm 33 and held as the arm is fully retracted to the position shown by the dashed lines in FIG. 3. The vacuum is then turned off, depositing the card on a tray or other suitable receiving means forming part of a further mechanism, not shown and not part of this invention, for transporting the designated card to and from a viewing station, for example.

A designated card is placed in storage by positioning it under the retracted pickup arm and applying a vacuum, drawing the card to the arm where it is held as it is transported by the module 4 to a selected stack location. The support rods 30, 31 are inserted into a separation in the stack at the selected location produced by the air stream from the main nozzle 22. The air stream is shut off and the pickup arm 33 holding the card is inserted into the separation 17 where the card is deposited on the lower stack 18 by turning off the vacuum.

After the transfer of a card into or out of the stack, the transfer module 4 is raised to place the main nozzle 22 adjacent to the separation and the air stream is turned on, raising the upper stack 19 above the support rods 30, 31. The arm and the rods are retracted and the stream shut off, completing the transfer cycle.

Figure 5:
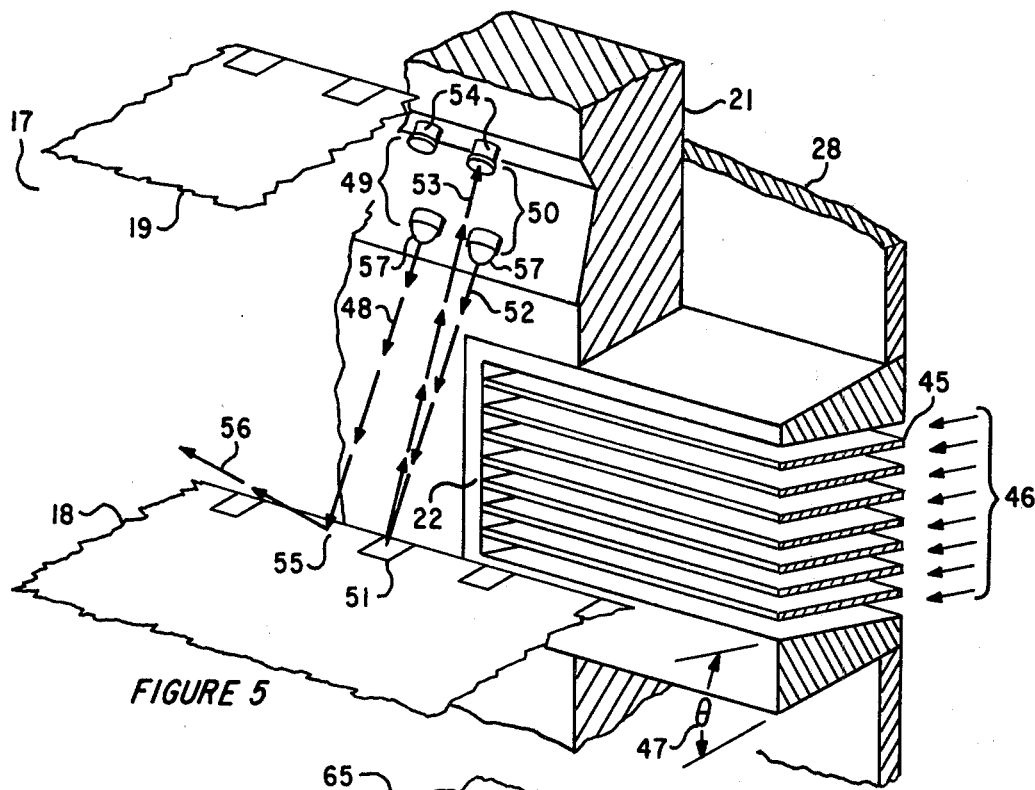
FIG. 5 is a detailed perspective drawing of a portion of the transfer module illustrating the nozzle used in separating a stack and the components used in detecting identification marks on a card.

Referring to FIG. 5, nozzle fins 45 are used to evenly distribute the air received from the chamber across the aperture of the nozzle 22. The nozzle is shown to be at an angle $\theta$ with respect to a line perpendicular to the face of the nozzle. This angle is referred to by drawing numeral 47. An air flow 46 passing through the main nozzle is directed upward towards upper stack 19. Although an optimum angle for lifting the upper stack has been found to be approximately 36° in an embodiment that has been constructed and tested, other angles are effective. The system operation can be simplified by eliminating the support rods; however, this requires the main nozzle to be capable of maintaining the separation by means of the air stream even when the pickup arm is in the separation partially blocking the upward flow against the upper stack.

Each card is provided with a number of retroreflective identification marks, such as mark 51, in an identification area along one edge of the card. A retroreflective identification mark redirects incident light toward the source of light, as will be described in greater detail hereinafter.

Mounted on the cover plate 21 above the main nozzle 22 is an assembly of identification mark reading units, two of which, 49 and 50, are shown in FIG. 5. The entire reading assembly is outside the stack and moves with the module to view the identification marks on each card as it is exposed by the separation. Each reading unit comprises a light source 57 and a light detector 54 disposed adjacent one another and both are directed at a respective part of the identification area on the top card of lower stack 18.

In the example shown in FIG. 5, unit 50 is directed at the retroreflective identification mark 51 while unit 49 is directed at a specularly reflective area 55. Light from the source in unit 50 is retroreflected to the detector by mark 51 as shown by light rays 52 and 53, whereas light from the source in unit 49 is reflected away from the detector as shown by light rays 48 and 56. The reading assembly detects the identification marks on each card as it is exposed by the separation without extracting the cards or moving the reading assembly into the separation, thereby facilitating high speed search.

If a portion of a specular reflective surface is reoriented with respect to its main surface, the reoriented surface, when considered by itself, remains specularly reflective, but it does not reflect incident light in the same direction as the main surface. By positioning the reoriented surface nearly perpendicular to incident light, the reoriented surface redirects the incident light toward the light source. The term retroreflective as used herein is intended to mean such redirection of incident light.

A specularly reflective surface, such as that of a microfiche, may be made retroreflective by reorienting a number of minute areas on its surface. Reorientation may be accomplished by embossing or impressing the surface of a microfiche card to produce a series of surfaces parallel to each other, but not parallel to the main surface of the card. An example of a retroreflective surface that may be produced by either of these methods is a series of grating marks, which, in one form, are simply a number of parallel indentations having a uniform sawtooth cross section with alternate surfaces oriented parallel to each other.

Figure 6:
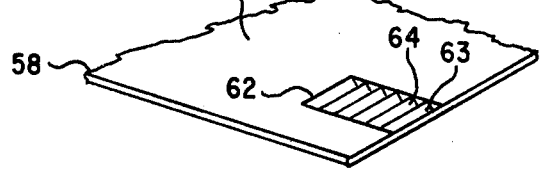
FIG. 6 is a perspective drawing of a card illustrating the surface contour of a retroreflective identification mark.

Referring to FIG. 6, card 58 carries a retroreflective identification mark 62 comprised of grating marks which have alternate surfaces, such as surfaces 63 and 64, parallel to each other, but not parallel to the main surface of the card 65.

A simpler form of retroreflective mark can be produced by merely abrading the surface of a microfiche. A number of randomly oriented surfaces are produced in the abraded area scattering the incident light; however, more light is reflected back toward the light source by the abraded area than by a specularly reflective area.

Although there are many ways markings may be used to identify a card, binary coding is commonly used with an automatic identification system operating in conjunction with a digital computer. Retroreflective areas on a card can represent binary "ones" or "zeros" or a system can be used in which a "one" and a "zero" in a paired set represent a single bit.

Figure 7:
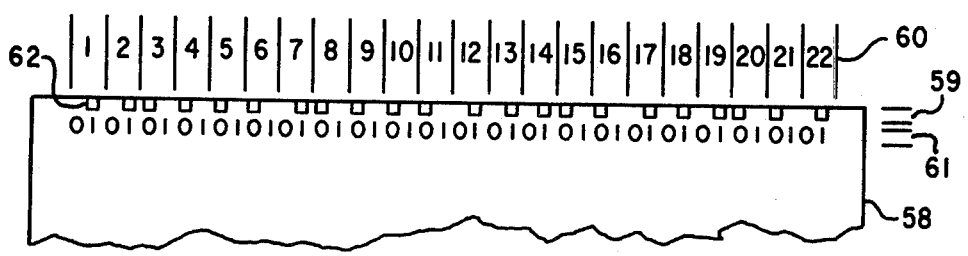
FIG. 7 is a diagram of a card showing the location of a series of retroreflective identification marks.

Referring to FIG. 7, card 58 contains 44 individual identification areas which can be grouped into 22 paired areas representing 22 bits. These areas are located along an upper portion of the card indicated by drawing numeral 59. The individual areas occupied by the 22 bits are shown by numbers in a row above the paired areas. This row of numbers is indicated by reference numeral 60. The left-hand identification area of each of the paired areas is designated as binary "zero" while the right-hand area is designated as a binary "one". Numerals "1" and "0" used to designating these areas are located below the areas in a row indicated by reference numeral 61. In the paired areas of bit 1, an identification mark 62 is shown in the right-hand area while no mark is shown the left-hand area. This placement of the identification mark indicates that bit number 1 represents a binary "one". By comparing the light intensity received by the two detectors viewing a paired area, the presence of a binary "one" in one of the areas can be detected over a wider range of incident light intensity than can be achieved with a system in which a single area represents a bit. The 22 bit identification system shown in FIG. 7 can be placed on a standard 105 by 148.75 millimeter card and is sufficient for the identification of over 4,000,000 cards.

The above identification system is compatible with the large card file storage and rapid access capabilities which this invention affords by elimination of the need for fiche holders and the consequent high storage density with minimum cost per card, and by the optical reading of card marks in a manner that does not interfere with or delay the card manipulations.

We claim:

1. Apparatus for separating a stack of cards to expose a card at a selected location in the stack, comprising:
    a. means for holding said stack of cards and restraining all of said cards from motion generally parallel to their surfaces, while separating said cards,
    b. means for projecting a stream of fluid at the edges of the cards in a localized region on one side of the stack to produce a separation of the stack that exposes a card in the stack, and
    c. means for adjusting the position of said fluid projecting means to expose the card at said selected location.

2. Apparatus as claimed in claim 1, wherein said means for projecting a stream of fluid is positioned to direct said stream substantially perpendicular to said card edges at an angle of less than 45° to said card surfaces and said means for adjusting includes means for moving the projecting means along a path substantially perpendicular to said surfaces.

3. A method of separating a stack of cards to expose a card at a selected location in the stack, comprising the steps of
    a. restraining all of the cards in the stack from motion generally parallel to their surfaces, while separating said cards,
    b. projecting a stream of fluid at the edges of the cards in a localized region on one side of the stack to produce a separation of the stack that exposes a card in the stack, and
    c. adjusting the position of the fluid stream to expose the card at the selected location.

4. Apparatus positioned outside of a stack of cards and to one side thereof for producing a representation of a pattern of retroreflective identification marks contained in an otherwise specularly reflective identification area on a card exposed by a separation in the stack comprising:
    a. a source of light illuminating the identification area through the separation at an oblique angle to the surface of said area, and
    b. light detection means positioned to receive said light reflected through the separation at an oblique angle to the surface of said area by way of retroreflection from said marks, but not by way of specular reflection from said area.

5. Apparatus for transferring a designated card into or out of a selected location in a stack of cards, each of said cards including an identification area containing a respective pattern of identification marks, comprising
    a. means for holding said stack of cards and restraining said cards from motion generally parallel to their surfaces,
    b. means for projecting a stream of fluid at the edges of the cards in a localized region of the stack to produce a separation that exposes a card in the stack,
    c. reading means positioned outside the stack to one side thereof for producing a representation of the pattern of identification marks on a card exposed by the separation, including a source of light illuminating the identification area on said card and light detection means directed at said area,
    d. means responsive jointly to the representation produced by said reading means and to a representation of the pattern of a card at said selected location for adjusting the position of said fluid projecting means to produce a separation that exposes the card at said selected location,
    e. transport means for picking up, holding and releasing said designated card, and f. means for moving said transport means into and out of said separation.

6. Apparatus as claimed in claim 5, wherein said identification area is specularly reflective, said marks are retroreflective and said detection means is positioned to receive said light by retroreflection from said marks, but not by specular reflection from said area.

7. Apparatus as claimed in claim 5, wherein said transport means comprises
   a. a pickup arm containing a suction port, and
   b. means for selectively applying a vacuum to said port.

8. A method of transferring a designated card into or out of a selected location in a stack of cards, each of said cards including an identification area containing a respective pattern of identification marks, comprising the steps of a. restraining the cards in the stack from motion generally parallel to their surfaces,
b. projecting a stream of fluid at the edges of the cards in a localized region on one side of the stack to produce a separation that exposes a card in the stack,
c. producing a representation of the pattern of identification marks on a card exposed by the separation,
d. adjusting the position of said fluid stream to expose the card at the selected location in joint response to said representation and a representation of the pattern on the card at the selected location,
e. picking up, holding and transporting said designated card into or out of the separation, and
f. releasing said card after transport.

* * * * *